Jan. 27, 1970  R. D. HEYWOOD  3,492,582
METHOD AND APPARATUS FOR TEACHING TRACK
RUNNERS PROPER PACING RHYTHM
Filed March 21, 1967  3 Sheets-Sheet 1
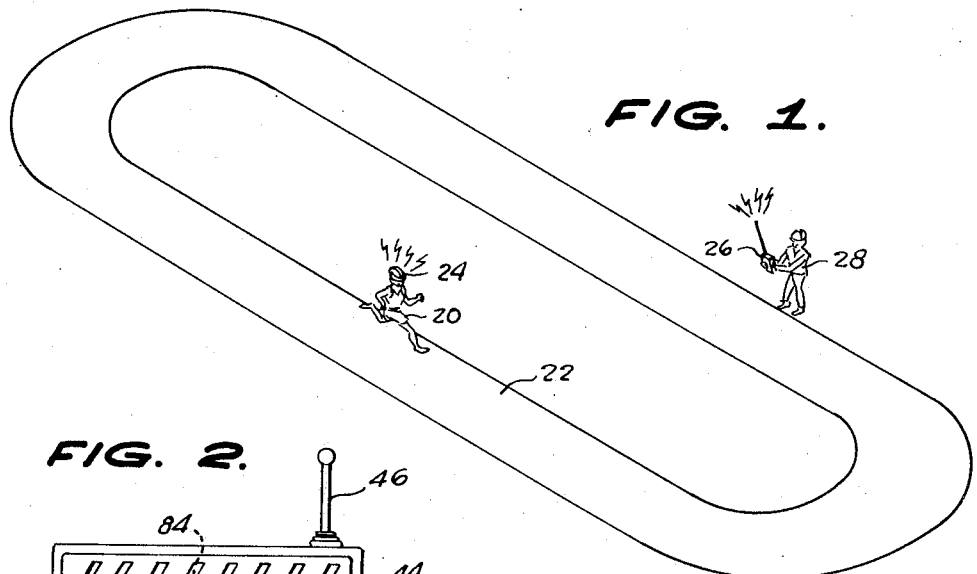
FIG. 1.
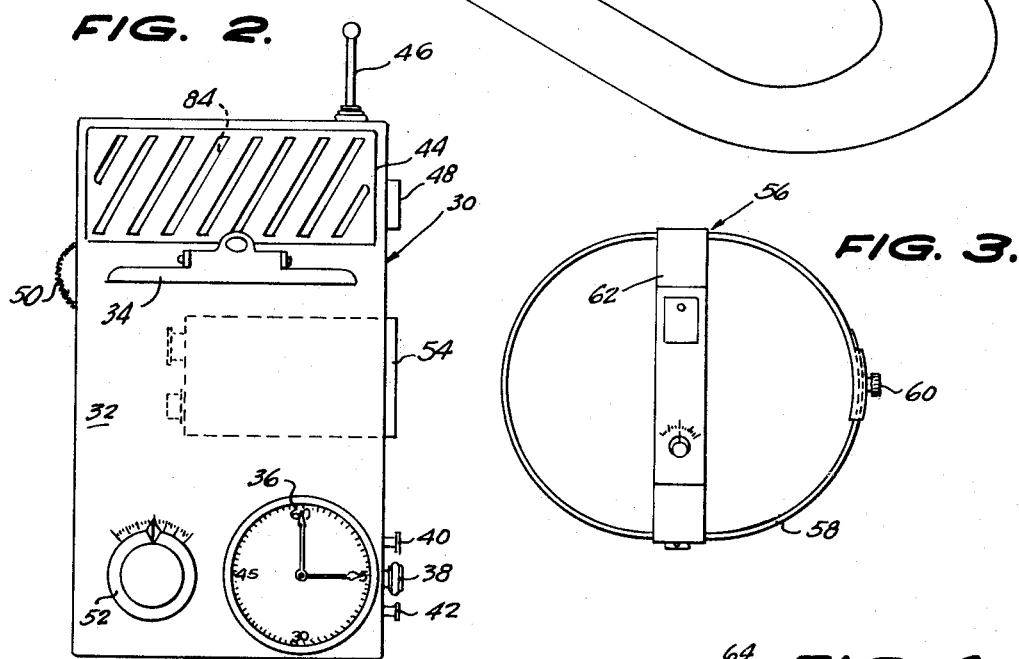
FIG. 2.
FIG. 3.
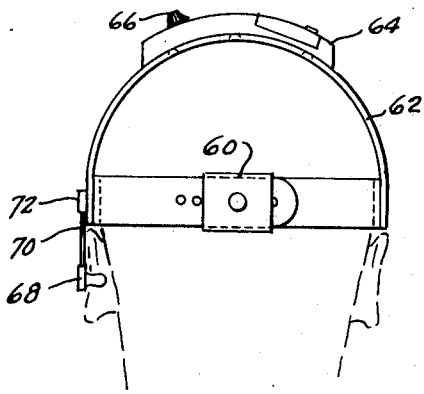
FIG. 5.
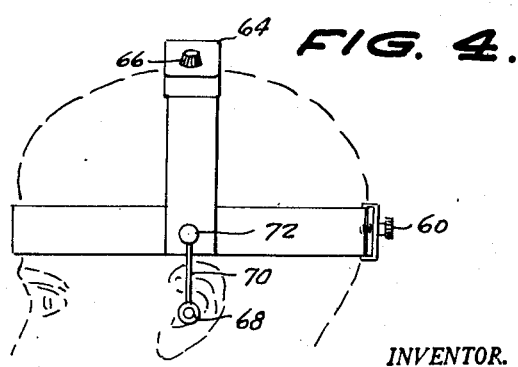
FIG. 4.
INVENTOR.
RICHARD D. HEYWOOD,
BY
Kimmel, Crowell & Weaver
ATTORNEYS.

Jan. 27, 1970  R. D. HEYWOOD  3,492,582
METHOD AND APPARATUS FOR TEACHING TRACK
RUNNERS PROPER PACING RHYTHM
Filed March 21, 1967  3 Sheets-Sheet 2

INVENTOR.
RICHARD D. HEYWOOD,
BY
Kimmel, Crowell & Weaver,
ATTORNEYS.

Jan. 27, 1970  R. D. HEYWOOD  3,492,582
METHOD AND APPARATUS FOR TEACHING TRACK
RUNNERS PROPER PACING RHYTHM
Filed March 21, 1967  3 Sheets-Sheet 3
FIG. 10.
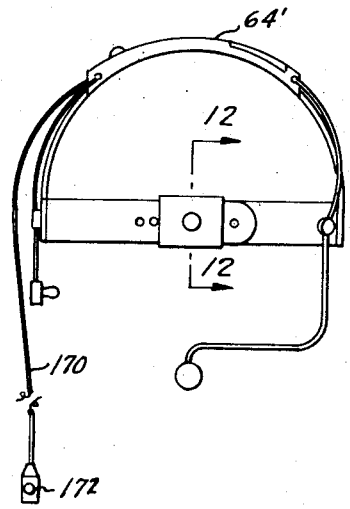
FIG. 11.
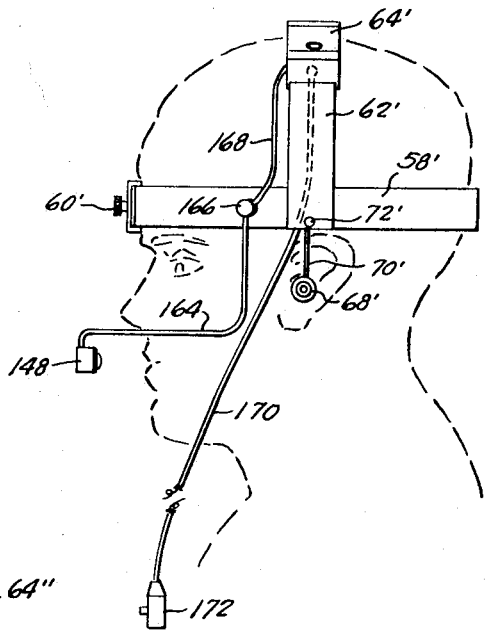
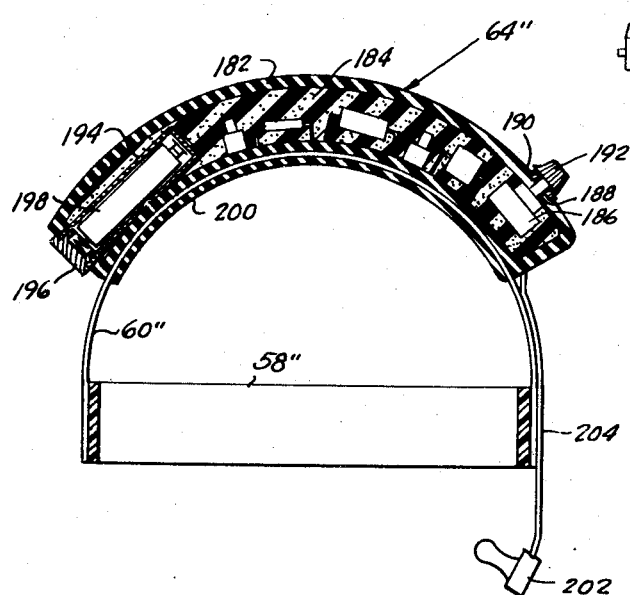
FIG. 12.
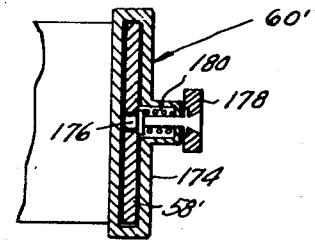
FIG. 13.
INVENTOR.
RICHARD D. HEYWOOD,
BY Kimmel, Crowell & Weaver,
ATTORNEYS.

# United States Patent Office 3,492,582
Patented Jan. 27, 1970

3,492,582
METHOD AND APPARATUS FOR TEACHING TRACK RUNNERS PROPER PACING RHYTHM
Richard D. Heywood, 3108 Jansen,
Las Vegas, Nev. 89101
Filed Mar. 21, 1967, Ser. No. 624,876
Int. Cl. H04b *1/04, 1/40*
U.S. Cl. 325—66  3 Claims

ABSTRACT OF THE DISCLOSURE

A method and system for teaching proper pace rhythm to track runners comprising a head frame for the runner, an audio oscillator and receiver on the head frame, a combination coach's console including a radio transmitter, a stop watch, a tape player and a controllable frequency audio frequency generator for transmitting a controllable audio frequency pulse signal to the runner are disclosed.

BACKGROUND OF THE INVENTION

Field of the invention

This invention relates to educational devices in general and more particularly to devices and methods for teaching physical culture.

Description of the prior art

The necessity or desirability of providing remotely controllable or previously adjustable devices for indicating to a track runner the rate at which he should be running has been recognized. For example, Allen et al. disclosed a method and apparatus in U.S. Patent No. 2,457,968 for an automatic pacing system which included a multiplicity of signalling devices arranged in spaced relation adjacent the track upon which the runner was to practice or to run. While this system has recognized part of the problem involved in teaching track runners to coordinate their pace to achieve the maximum possible speed over the entire distance of the track it has fallen short in at least two major areas. First, it was not there recognized that something more is required for education of a track runner than merely indicating the position on the track where he should be at a given time. Indeed, it has only lately been recognized that the most essential element in teaching a track runner is not directed related to the elapsed time from one point to another but is the rhythm which the track runner can achieve and maintain over a given distance. In addition to this inadequacy, it will be apparent that the system disclosed by Allen et al. is very expensive and requires a substantially permanent installation with attendant very heavy costs. There is yet another disadvantage to the Allen system in that where a number of runners are on the track at the same time each is made aware of the pace at which the other is running and may attempt to duplicate this pace. It will be apparent that in a teaching situation where there may be a very experienced runner on the track along with a novice it would not be desirable to attempt to pace the experienced runner and the novice at the same pace. Accordingly, it would be dsirable to communicate to the track runner a pace commensurate with his training and development without communicating the same information to another runner who may find this information actually detrimental in the educational process.

A similar device in concept is disclosed by Clinton, by U.S. Patent No. 3,119,610, as applied to pacing swimmers. While the present invention is primarily related to the teaching of track runners, it will be understood that the equivalent teachings may be applied in the education of swimmers and it is considered that wherever reference is made to a track runner the term would include the equivalent swimmer. The Clinton patent also requires a permanent installation and communicates the same pacing information to all swimmers in the pool. Accordingly, it suffers from the same disadvantages as the Allen et al. system.

There is yet another disadvantage of both the above systems in that in both systems the runner, or swimmer, must keep his eye on a single signalling device or a multiplicity of signalling devices to determine his proper pace rate. It will be apparent that this tends to limit the freedom of motion of the runner since it immobilizes or at least controls the position of the muscles in the neck and shoulder and requires concentration by the runner on an external object thereby reducing his concentration on pacing his steps or strokes. To overcome this latter disadvantage, the present inventor first provided a loudspeaker system and an electronic or mechanical timed pulse or signal generating device which was put into the loudspeaker system. In this manner, a timed audible pulse was radiated out over the track by which the runner could regulate his step pace. While this was a step forward in that it did not require visual concentration by the runner and it was more closely related to the teaching of rhythm rather than merely elapsed time it suffered from several disadvantages. First, it will be apparent that the pace intended for one runner was heard by all the runners with the previously mentioned resultant disadvantages. Secondly, because of the Doppler effect, reflected sounds, and the changing distance between the loudspeaker and the runner it was not possible to obtain entirely satisfactory results even with a single runner since the runner sometimes heard reflected sounds and became confused as to which pulse he should be using to regulate his pace and there was an effective change in the pulse rate as a result of the Doppler effect.

After considerable experimentation with audible and mechanical devices the present inventor fell back upon his experience in teaching music and decided that it would be desirable to provide a basic signal moving with the runner and closely adjacent to the runner much in the manner in which the drummer who moves with a marching unit controls the pace of all members of the marching unit. The question was what practical method could be used to communicate a timed audible signal to the runner alone which would be controllably variable and yet which would not vary with the location or position of the runner. Two solutions were hit upon. The first involved a head frame carried by the runner which is constructed to be light enough so as not to interfere significantly with the runner which carried thereon an audio oscillator or audible signal generating device and an earphone which communicated a timed audible signal to the runner. In an improved concept, the runner carries on the head frame a radio receiver and an earphone and the coach is provided with a radio transmitter through which he may transmit a controllable frequency audio signal to the receiver which is then communicated by the earphones to the runner. This has the highly important advantage of permitting control of the pace by the coach.

Compact radio receivers are not unknown to the art and, as such, constitute only an element of the invention. Such a receiver is shown, for example, in U.S. Patent No. 2,554,270 to Rosenberg. No novelty is claimed in applicant's radio receiver components as such but rather in the utility and application of the radio receiver in the system and in the method. A similar construction of a receiver in a helmet is shown in U.S. Patent No. 2,904,645 to Sarles. The latter patent bearing some very general relation to the present invention in that it permits communication by a coach to a player on the field but the basic inventive concept, that is controlling the rhythm and pace of a runner or the stroke of a swimmer or the like, is missing. Accordingly, the present inventon is distinguished over the prior art primarily by the recognition of the principal problem in teaching runners properly to pace their steps in a rhythmic fashion by communicating to the runner a timed audible signal and by permitting a coach to control the frequency of the timed audible signal.

SUMMARY

The present invention contemplates as its objects and purposes the provision of a head frame to be carried on the head of a runner with means on the frame for deriving an electronic signal and means for communicating an audible signal including a timed pulse component to the runner for indicating to the runner the desired rate of pace.

An additional object and feature of the invention is the provision of an audio frequency signal generating device carried on the head frame of a runner for deriving a controlled frequency audio pulse and means carried by the head frame for audibly communicating the pulsed signal to the runner.

A very important and distinctive feature of the present invention resides in the provision of a head frame for deriving an electronic signal which includes a receiver for radio frequency signals and wherein the system includes a transmitter for use at a remote location by the coach and a controllable frequency audio frequency generator connected for modulating the receiver for transmitting timed audio frequency pulses, the frequency of which is controlled by the coach, to the receiver and means connected to the receiver for audibly communicating the pulses to the runner.

An additional object of the invention comprises the provision of a coach's console which includes a writing surface such as a clip board, a stop watch which is exposed for use by the coach, a radio transmitter and a controllable frequency audio frequency generator connected for modulating the radio transmitter for transmitting a controllable audio frequency timed pulse to a headset being worn by a runner and means on the headset for communicating the timed pulse audibly to the runner. In a prefeerrred embodiment, a tape player may also be mounted for modulating the transmitter.

An additional feature of the invention and an object thereof is the provision of a waterproof encapsulated signal deriving means on a head frame which may be carried by a swimmer.

Yet an additional and highly significant feature of the invention is the provision of a two-way communication system including a receiver and a transmitter carried on a head frame by the runner and a receiver and a transmitter at a remote location operated by the coach in which means are provided on the head frame for suppressing or squelching the transmitter at all times when the coach is transmitting a signal for reception by the receiver on the head frame.

Perhaps of greatest significance is the object of the invention in the provision of a method for teaching rhythm and pacing to runners which includes the steps of deriving a controllable audio frequency signal which includes timed pulses and deriving an audible signal including the timed pulses and communicating the audible signal to the runner. This object may be accomplished by the steps of deriving a radio frequency signal and modulating the radio frequency signal with the controllable frequency audio frequency timed pulse signal for transmission to a receiver wherein the signal is demodulated and the timed pulse signal is audibly communicated to the runner to permit the coach to thereby control or regulate the pace rate and rhythm of the runner. While the above objects are exemplary of the purposes, objects, and important features of the invention, other objects and purposes will become apperent to those skilled in the art from the specification which follows and from the drawings to which reference is made.

BRIEF DESCRIPTION OF THE DRAWING

FIGURE 1 shows an overall view indicating the system and method to which this invention relates in its preferred form.

FIGURE 2 is a front surface view of the coach's console which comprises an important feature of the invention.

FIGURE 3 is a top view of one embodiment of the head frame and signal deriving means carried thereon.

FIGURE 4 is a side view of the head frame as shown in FIGURE 3.

FIGURE 5 is a rear view of the head frame as shown in FIGURE 3.

FIGURES 8 through 10 show an alternative embodiment of the head frame, FIGURE 8 showing a two-way communication system in schematic functional diagram, FIGURE 9 showing an exemplary switch of the type used in FIGURE 8 and FIGURES 10 and 11 showing respectively, a rear view and a side view of the head frame in which the alternative embodiment of the electronics are carried.

FIGURE 12 is a detail of the means for adjusting the size of the head frame taken substantially along lines 12—12 in FIGURE 10.

FIGURE 13 is an alternative embodiment showing a waterproof model of the head frame in which all the electronic components are encapsulated in a waterproof resilient cover for use by a swimmer.

DESCRIPTION OF THE PREFERRED EMBODIMENTS

Figure 6:
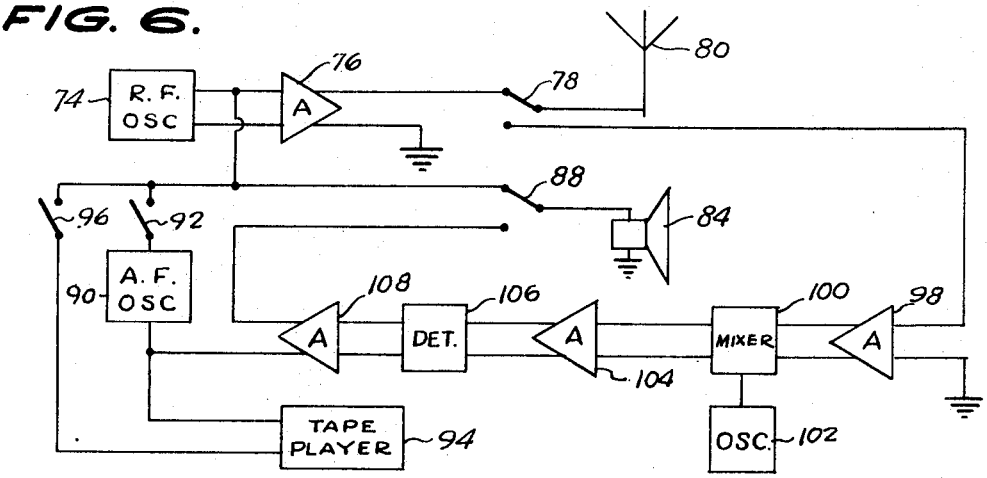
FIGURE 6 is a schematic functional diagram of the electronic system at the coach's location which may be in a preferred form mounted in the coach's console shown in FIGURE 2.

Reference is made to FIGURE 1 for an understanding of the overall concept of the invention. As shown in FIGURE 1, a runner 20 who is practicing on a track 22 is provided with a head frame 24, of a type which will be described with great particularity hereafter, which includes means for deriving an audible signal and communicating the audible signal which includes timed pulses to the runner. In the preferred embodiment of the invention, the means for deriving the audio signal comprises a radio receiver which receives a radio frequency signal from a transmitter 26 which is at a remote location controlled by a coach 28. In the preferred embodiment, other forms of communication between the coach and the runner are provided but for present purposes it is sufficient to state that an essential and basic concept of the invention resides in the use of timed pulses for teaching a runner to control his pace and pace rhythm and in the system for permitting the coach to thereby control the pace rhythm of the runner.

Reference is made now to FIGURE 2 which shows the overall combinational aspects of the coach's console which constitutes a very important feature of this invention. Since it is necessary for the coach to move from position to position to permit adequate viewing of runners and of track conditions, etc., in order to properly guide the runner in his physical development it is essential that means be provided to the coach for communicating with the runner which may be carried by the coach with a minimum of difficulty and which will permit the coach to record such information as times, problems noted, and other information which he may deem desirable. Accordingly, a console 30 is provided which includes on at least one side thereof a generally planar surface member 32 and in a preferred embodiment may include a clip 34 which permits the console to serve, in effect, as a clipboard. The console is provided with a stop watch 36 which is viewable through the generally planar surface member and which, in the preferred embodiment, has controls such as a winding stem 38, STOP and START buttons 40 and set buttons, etc., 42, extending from the side of the console for easy access by the coach. Thus, the cooperative relationship of the planar surface and the stop watch permits the coach to make notes and record times with a minimum of inconvenience.

The console also includes a transmitter 44 which in turn may include an antenna 46, a transmit control button 48 and a volume control and ON/OFF control 50 in the conventional manner. An important feature of the invention resides in a controllable frequency audio frequency generator, the control of which is shown at 52, mounted in the console for generating timed pulses. As will be described hereinafter, the output of the audio frequency generator is interconnected with the transmitter to thereby modulate the transmission. In one embodiment of the invention, a tape player 54 is also provided in the console in a space beneath the writing surface which permits modulation of the transmitter by a signal recorded on the tape which may be simply timed audio pulses of a constant or fixed frequency, as well as the modulation of the transmitter by a signal taken from a tape which includes timed pulses which for a period may be of a constant rate and which may increase in rate as the runner approaches the end of the race. In addition, of course, in order to prevent the runner from becoming bored, music may be played through the tape which includes or has superimposed thereon a timed pulse component.

It will be seen, then, that while all the components of the coach's console are known in the art and the present invention contemplates the inclusion of the known individual compoents, the components cooperate in the console to permit the coach to perform his overall function more efficiently and more effectively, that is, the teaching of track runners to improve their rhythm and speed.

Reference is now made to FIGURES 3, 4 and 5 which show the head frame carried by the runner. As shown best in FIGURE 3, the head frame 56 comprises a circumferential strap 58 which may be of leather, plastic, or other convenient material and may be flexible or semi-rigid, although some flexibility is necessary for adjustment. Adjustment is provided by an adjusting mechanism 60 which will be described in greater detail hereinafter to permit adjustment of the size of the strap to fit the heads of different runners. The head frame also includes an upright strap 62 upon which the electronic components which comprise the audible signal deriving means are mounted. One important facet of this invention is the mounting of the electronic components directly on top of the runner's head. This prevents an undue strain on the neck and shoulder muscles of the runner which would result from the mounting of the components on the front, back or the sides of the head. In addition, this makes the head frame set more easily and more stably on the runner's head. Thus, as shown best in FIGURES 4 and 5, the signal deriving means 64 which may include a controller 66 is mounted on the upright frame 62 so that the center of gravity thereof is susbtantially in the center of the runner's head. A light depending earphone 68 is connected by a wire 70 and a bracket 72 to the head frame. Of course, any convenient earphone and mounting system may be used but it is important to keep the weight of the earphone and mounting to a minimum since any significant weight tends to result in an unbalanced condition with respect to the head frame. Therefore, while the electronic components and systems used in the invention are, individually, known in the art, the combination of these components in a head frame suitable for use by a runner constitutes an important feature of the present invention. One of the important facets of the present invention lies in the provision of a symmetrical balanced head frame which is extremely light and which may conveniently be used by a runner as opposed to imbalanced head frames and helmets and the like as shown in the prior art.

Reference is made now to FIGURE 6 in which the electronic configuration of the relevant components in the coach's console are shown in schematic functional diagram. The transmitter 24 comprises a radio frequency oscillator 74 which is fed through an amplifier 76 which, as will be seen, also may serve as a modulator through a selector switch 78 to an antenna 80 when the transmitter is being used. Modulation of the transmitter may be accomplished by voice using a speaker 48, the mounting of which is indicated in FIGURE 2, and which also serves as a microphone which feeds a voice signal through a switch 88, in the transmit position, to the output of the oscillator to thereby modulate the transmitter. The transmitter may also be modulated by an audio frequency oscillator 90 selectively through a switch 92 to the output R.F. oscillator 74 to thereby modulate the transmitter. Similarly, modulation may be accomplished by a tape player 94 selectively through a switch 96 to the output of the R.F. oscillator 74.

As will be apparent, a receiver is also provided in conjunction with a transmitter so as to provide, in effect, a transceiver. As shown in FIGURE 6, switches 78 and 88 are in the transmit position, but, when they are thrown to the receive position, the other position as shown in FIGURE 6, a signal is picked up on antenna 80 and fed through switch 78 to a radio frequency amplifier 98 and a mixer 100 which heterodynes the input signal with the output of oscillator 102 to provide an intermediate frequency which is amplified by amplifier 104 and detected by detector 106. The demodulated audio frequency output of detector 106 is amplified by an audio frequency amplifier 108 and applied through switch 88 to speaker 84, which, in the receive position, acts as a speaker rather than as a pickup transducer.

It will be apparent that from the electronic standpoint there is nothing new in the individual components nor in the electronic interconnection therebetween, the invention residing in the system and in the method. A novel feature does reside, however, in the interconnection of the tape player, the audio frequency oscillator, and the voice input for modulating the output of the R.F. oscillator. In the first embodiments and models of the invention, a commercially available transceiver of the type sold by several commercial suppliers for use in the citizens' band range was modified with the indicated inputs for modulation. Actually, even before this, a timed audible pulse was merely communicated through the speaker 84 for modulating the transmitter but this combination, while effective for teaching, was cumbersome and not entirely satisfactory from the coach's standpoint. The combination of components as shown in FIGURE 2, however, will result in a console which is entirely satisfactory.

Figure 7:
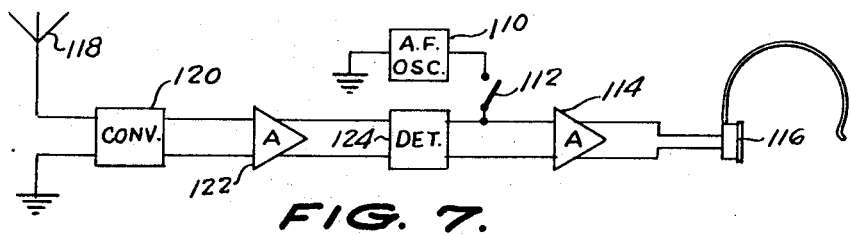
FIGURE 7 is a schematic functional diagram of the signal deriving means carried on the head frame as shown in FIGURES 3 through 5.

Reference is made now to FIGURE 7 which shows one preferred embodiment of the electronic system carried on the head frame which comprises the means for deriving and communicating a timed audible pulse to the runner. In this embodiment, in its simplest form, all that is required is a controllable frequency audio frequency generator 110 which, selectively, may be fed through a switch 112 to an amplifier 114 if this deemed necessary to an earphone 116 which is schematically shown in the conventional manner but in fact would be of the type previously described. In this embodiment, the frequency of the timed pulses which are produced by the oscillator 110 may be controlled by the control member shown at 66 in FIGURES 3 through 5.

In an alternative and preferred embodiment the audible timed pulse signal deriving system also includes, or includes only, a receiver which comprises an antenna 118 which is fed directly to a converter 120 and to an I.F. amplifier 122 and a detector 124, the output of the detector being fed through amplifier 114 to earphone 116 in the conventional manner. In the overall combination, it will be seen that the runner may use the oscillator 110 and practice his pace and rhythm control independently of the coach and the coach may also, through the use of selector switch 112, communicate with the runner and communicate a voice instruction from speaker-microphone combination 84, a fixed frequency audio timed pulse signal which may be controlled by the coach from oscillator 90 or an audio signal which may be played from tape player 94. Thus, maximum flexibility in the education and teaching of a track runner, or the equivalent swimmer, is provided.

Figure 8:
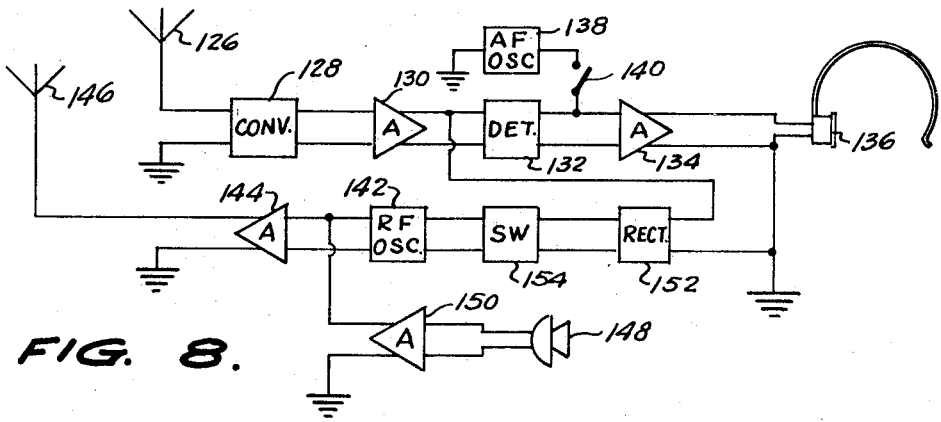
Figure 9:
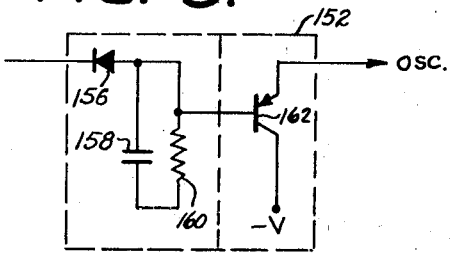

Reference is made now to FIGURES 8 and 9 in which an electronic functional and schematic diagram is used to illustrate an alternative and highly useful embodiment of the head frame of this invention which, though somewhat more expensive and heavier, provides great additional flexibility in permitting two-way communication between the runner and the coach. Particular attention is directed to the concept and system for permitting the coach to control this two-way communication. With reference particularly to FIGURE 8, the two-way communication means, which in effect comprises a transceiver, includes a first antenna 126 which picks up a signal from antenna 80 and which signal is fed to a converter 128 with the I.F. output of the converter being fed to an amplifier 130. The I.F. signal is fed to a detector 132 and the demodulated audio frequency signal is fed through an amplifier 134 and to earphone 136 in the manner described with respect to the embodiment of FIGURE 7. An audio oscillator 138 may selectively be fed through switch 140 and through amplifier 134 to earphone 136 in the manner described with respect to the output of audio oscillator 110 in FIGURE 7. Thus far, the present embodiment does not differ from the embodiment of FIGURE 7. However, there is provided in addition, a transmitter and means for controlling the transmitter by the received signal. Thus, an R.F. oscillator 142 may be fed through an amplifier 144 to a second antenna 146. Modulation is provided through a microphone 148 and a preamplifier 150. As will be seen hereinafter, the microphone 148 is positioned to pick up the voice of the runner and is connected as shown in FIGURE 8 for modulating the output of a transmitter. It will be understood that the operating frequency of oscillator 142 will differ from the operating frequency of oscillator 74 in the coach's console transceiver as shown in FIGURE 6, and that amplifier 98 will be tuned to the operating frequency of R.F. oscillator 142. Conversely, converter 128 will be tuned to the operating frequency of oscillator 74. It will also be understood that a single antenna could be used in place of the two antennas 126 and 146; however, it is more convenient to use two separate antennas than it is to provide adequate filtering means to prevent a signal from being fed through converter 128 and amplifier 130. The effect of feeding such a signal back through the receiver will have obvious undesirable results but will have an additional and, in the present case, totally self-defeating result as now discussed. Means are provided for taking the output of the receiver, preferably after the I.F. amplifier 130, and for controlling the transmitter to squelch the transmitter output whenever a signal is being received through converter 128 and amplifier 130. In the present embodiment, this means includes a rectifier 152 for the output of I.F. amplifier 130 and a switch 154 which controls the output of oscillator 142. By control, here, is meant that whenever a signal is being received and amplified through amplifier 130 and rectified through rectifier 152, switch 154 is effective to prevent oscillation and generation of a radio frequency signal by oscillator 142 thereby effectively squelching or suppressing the transmitter. A more detailed schematic diagram of one such rectification and switching system is shown in FIGURE 9 wherein rectifier 152 may include a diode 156 and a filter or time constant network including a capacitor 158 and a resistor 160. The output of the time constant network is fed to the base of a normally conducting transistor 162 which, in its normal state, applies an operating voltage to the oscillator but when a reverse biasing voltage is applied from rectifier 152 the voltage is no longer applied to the oscillator thereby dampening and preventing oscillation thereof. Of course, there are several equivalent circuits which could be used, such as silicon controlled rectifiers, and even mechanical relays although the latter are undesirable for present applications from the standpoint of weight and mechanical ruggedness.

Reference is made to FIGURES 10 through 12 now, in which the physical arrangement of the alternative embodiment is shown. In this embodiment, a strap 58' is shown which includes, in front in this embodiment, an adjusting mechanism 60', shown in greater detail in FIGURE 12, and an upright strap 62'. The audible signal producing electronic components 64' are arranged on the upright strap 62' in the manner previously described.

The earphone is provided in the manner previously described as shown at 68', 70' and 72'.

In addition, however, microphone 148 is suspended by a light resilient wire 164 and a bracket 166 from the head frame. The signal from the microphone 148 is fed through a conductor common with the wire 164 and through a conductor 168 to the transceiver shown generally at 64'. In one embodiment, it may be desirable to permit the runner to control his own transmission. In this embodiment, the output of oscillator 142 is controlled, as by controlling the voltage input thereto, through a conductor 170 and a switch 172 which the runner may carry in his hand or which may be attached to his waist, etc. In this embodiment, according to conventional electronic practice, the runner applies a voltage to the oscillator whenever he desires to transmit.

With reference now to FIGURE 12, the adjustment mechanism 60' includes a receiving clamp 174 for strap 58 which is provided with apertures and a pin for engagement in one of the apertures, said pin being operable by a knob 178 and being resiliently biased inwardly toward strap 58 by a spring 180. Of course, any conventional strap adjusting means such as a buckle, etc., could be used.

For use by swimmers, it is necessary to adapt the head frame slightly. In this embodiment, the strap 58'' is of a waterproof or water resistant material as is the upright strap 60''. In addition, the signal deriving means 64'' is encapsulated in a waterproof covering 182 which may be of rubber, vinyl plastic, or any desired plastic or resilient waterproof material. Preferably, all the components are poted in a less solid resilient material such as a sponge rubebr, silicone potting compound, etc., as shown at 184.

In this embodiment, the audio frequency is controlled by the swimmer as by a conventional micropotentiometer 186 through a shaft 188 which is sealed against entry of water by a grommet 190 which is operated by a knob 192. The battery casing 194 is accessible from the outside of the encapsulated portion by a waterproof cap 196 which permits removal and replacement of a battery 198.

Additional resilient material shown generally at 200 may be used for attaching the encapsulated package to the strap 60''. A waterproof earphone 202 is connected by a waterproof conductor 204 by conventional electronic means. Thus, means are provided for deriving a timed pulse and communicating the timed pulse, which is controllable by a remotely located coach, to a swimmer to assist the swimmer in developing his stroke rhythm.

To further assist in the understanding of the invention, its application and utility and with particular regard to the process, a typical application of the process and apparatus of the invention will be described. By using the formula $$LR = \frac{180D}{T.S.}$$

wherein LR represents the lap rate, D represents the distance to be covered, T represents the time in which the distance is to be covered and S represents the stride length of a given athlete the following table may be derived.

| Length of Stride | Strides per Lap | L.R. for 80-sec. Lap | L.R. for 75-sec. Lap | L.R. for 70-sec. Lap | L.R. for 68-sec. Lap | L.R. for 66-sec. Lap | L.R. for 62-sec. Lap | L.R. for 60-sec. Lap |
|---|---|---|---|---|---|---|---|---|
| 5 ft | 264 | 198.0 | 211.2 | 226.3 | 232.9 | 240.0 | 255.5 | 264.0 |
| 5'4" | 247.5 | 185.6 | 198.0 | 212.2 | 218.4 | 225.0 | 239.5 | 247.7 |
| 5'8" | 232.4 | 174.7 | 186.3 | 199.7 | 205.5 | 211.8 | 225.4 | 232.9 |
| 6 ft | 220.0 | 165.0 | 176.0 | 188.6 | 194.1 | 200.0 | 212.9 | 220.0 |
| 6'4" | 208.4 | 156.3 | 166.7 | 178.7 | 183.9 | 189.5 | 201.7 | 208.4 |
| 6'8" | 198.0 | 148.5 | 158.4 | 169.7 | 174.7 | 180.0 | 191.6 | 198.0 |

Of course, the first step that must be taken is to establish what the length of the boy's strike will be at a given pace. From the boy's stride, the time in which he should run the given distance may be estimated. The runner then should try the track and his stride should be measured at several points along the track to determine what his average stride is. The measurement is made from the point in which the track where the boy's foot breaks the ground to the point where the boy's foot breaks the ground on his alternate leg. Preferably, several measurements should be made on several occasions. As the boy gets into better physical condition and develops his rhythm, his stride will become more and more even and he will be able to maintain it for a longer period of time. Of course, this will change the average and as the boy develops the length of his stride and his estimated time, etc., must be adjusted accordingly. It is important, in the education of a boy, that the pacer be set to correspond to the boy's state of physical development, his size, and his experience. Considerable damage can be done in the education of a runner if at the outset the pacer is set and the boy is instructed to adjust the length and speed of his pace accordingly. This, incidentally, is one reason why the devices of the prior art have not achieved notable success. The additional factor, of course, is that all boys run differently. The pacer must be set realistically to the natural gait of the runner. The runner should be cautioned not to overstride or to understride but to maintain an even natural relaxed pace and to stride within his own capabilities. It is the flexibility of the present system which permits the pacer to be set initially to the boy to correspond to the boy's capabilities which distinguishes the present invention from those of the prior art.

After the average stride has been determined, the next step is to teach the boy a proper and uniform pace by occasional use of the pacer. Initially, at least, the pacer should not be used at all times. A few days a week or a few trials each day will suffice. During the first few runs, it will be noticed that the boy will not be able to correspond his pace to the frequency of the pacer. The boy will also have a slightly shorter muscle stride until he overcomes the internal resistance of the muscles or until he is warmed up; therefore, the pacer must be adjusted to the immediate condition of the runner. Conversely, toward the end of the workout period there will be a drop of time indicating that the boy is becoming tired and can no longer maintain his stride or his pace. Over a period of weeks, however, the runner will be able to maintain an even pace and stride for increasingly longer times. He will be able to run the interval at the desired pace more frequently. As the boy's physical condition improves and as he becomes a more experienced runner, the rate of pace may be increased a small step at a time and the runner will adapt his pace to the increased frequency of the output of the pacer. Too rapid an increase in the output frequency of the pacer, however, will tend to make the runner understride to keep up with the pace.

As will be recognized by any coach or teacher, the best approach for teaching the runner to develop his pace and rhythm will be determined by the characteristics of the given boy. Here again, the flexibility and control available to the coach is a very important feature of the present invention. Techniques and methods of using the present invention and applying the present method will become apparent from the preceding disclosure and from use by those skilled in the art.

Moreover, while the present invention has been abstracted, summarized and disclosed with reference to a specific method, specific embodiments, specific elements and specific constructions and combinations, it will be realized that variations may be made from the specific embodiments disclosed in the light of the present teachings without departing from the spirit of the invention.

I claim:

1. A method for teaching track runners to properly pace their rate of running, which comprises the steps of:
   measuring the average length of the runner's stride;
   calculating the lap rate according to the formula $$\text{Lap rate} = \frac{180 \times (\text{Distance})}{(\text{Time}) \times (\text{Stride length})}$$

producing an audible signal having a pulsed component corresponding to the lap rate calculated; and
   transmitting the audible signal to the runner to thereby provide the runner with an audible pace signal by which he can control his pace rate.

2. The method of claim 1 wherein the step of producing an audible signal comprises the steps of:
   producing a radio frequency signal;
   modulating the radio frequency signal with an audio frequency signal;
   transmitting the modulated radio frequency signal;
   receiving the modulated radio frequency signal;
   demodulating the modulated radio frequency signal at the runner's location; and
   converting the electrical energy of the demodulated signal to a signal which is audible to the runner to thereby permit a coach at a remote location to regulate the pace rate of the runner by controlling the audible signal pulse rate presented to the ears of the runner.

3. The method of claim 1 further comprising the step of:
   gradually increasing the frequency of said audible signal pulses as the runner's physical capabilities improve to increase the pace rate of the runner.

References Cited

UNITED STATES PATENTS

| | | | |
|---|---|---|---|
| 2,005,158 | 6/1935 | Nicolson | 58—152 |
| 2,070,112 | 2/1937 | Bowles | 325—361 |
| 2,522,492 | 9/1950 | Anderson | 331—64 XR |
| 2,845,536 | 7/1958 | Goldstein | 331—64 XR |
| 2,904,645 | 9/1959 | Sarles | 325—361 |
| 3,026,411 | 3/1962 | Beers | 58—152 |
| 3,122,847 | 3/1964 | Redfield et al. | 325—361 |
| 3,218,607 | 11/1965 | Brock et al. | 325—361 |
| 3,249,873 | 5/1966 | Whittemore et al. | 325—361 |
| 3,254,444 | 6/1966 | Paterson | 325—361 |

JOHN W. CALDWELL, Primary Examiner

CARL R. VONHELLENS, Assistant Examiner

U.S. Cl. X.R.

35—28; 58—152; 325—16, 118, 310, 361